United States Patent [19]

Hanzlik

[11] 4,336,929
[45] Jun. 29, 1982

[54] VARIABLE CORRUGATION VACUUM CORRUGATING SHEET FEEDER

[75] Inventor: Edward W. C. Hanzlik, Webster, N.Y.

[73] Assignee: Xerox Corporation, Stamford, Conn.

[21] Appl. No.: 174,785

[22] Filed: Aug. 4, 1980

[51] Int. Cl.³ .............................................. B65H 3/12
[52] U.S. Cl. ...................................... 271/20; 271/35; 271/99; 271/106; 271/165
[58] Field of Search ................... 271/165, 166, 20, 35, 271/98, 99, 106

[56] References Cited

U.S. PATENT DOCUMENTS 3,826,485  7/1974  Shindo ................................ 271/106
4,181,298  1/1980  Capdeboscq ..................... 271/106 X
4,270,746  6/1981  Hamlin .................................. 271/98

Primary Examiner—Richard A. Schacher

[57] ABSTRACT

A sheet feeder for separating and feeding the bottom sheet in a stack, a biased corrugating ramp being provided to provide a large corrugation in light weight papers for maximum feeder reliability. The corrugating ramp is adapted to be depressed by heavy weight, stiff sheets to allow the sheets to more closely approach the vacuum feed belts and assure adequate acquisition thereby.

6 Claims, 5 Drawing Figures

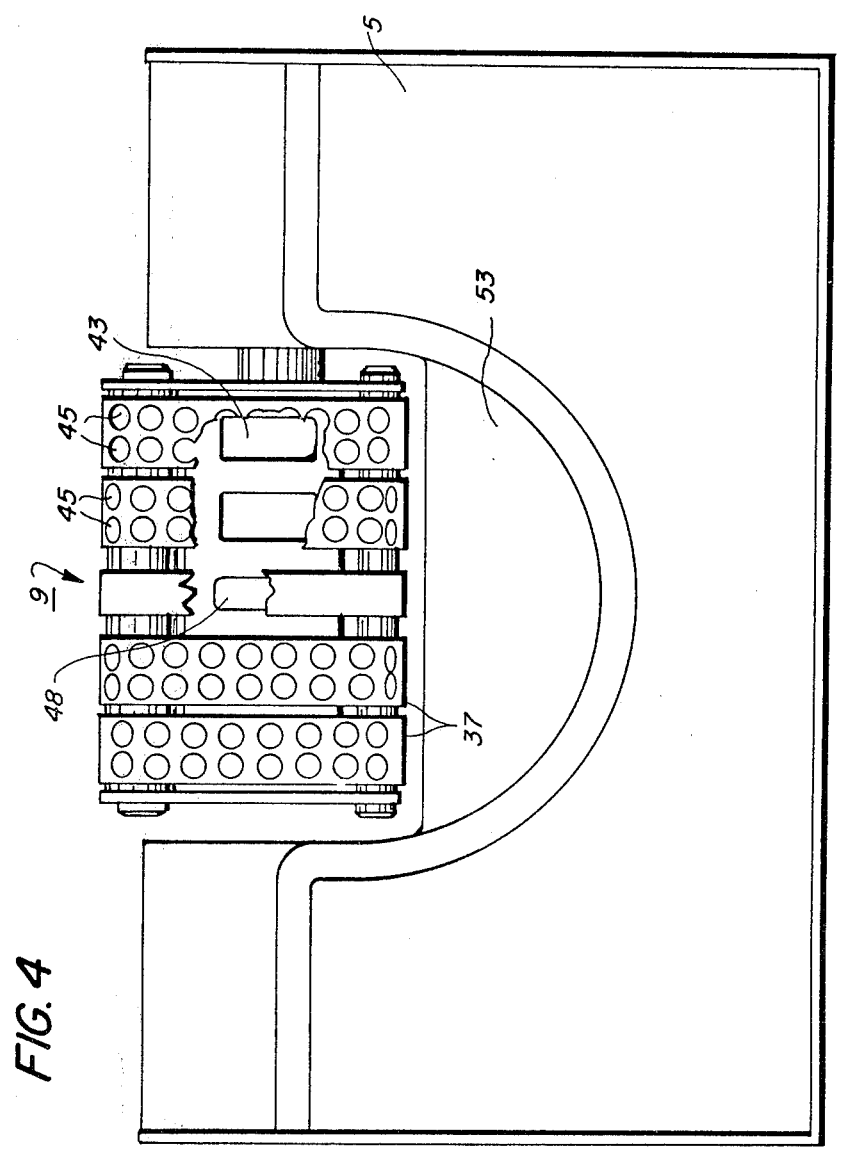

VARIABLE CORRUGATION VACUUM CORRUGATING SHEET FEEDER

With the advent of high speed xerographic copy reproduction machines wherein copies can be produced at a rate in excess of three thousand copies per hour, the need for a document handler to feed documents to the copy platen of the machine in a rapid, dependable manner was recognized to enable full utilization of the reproduction machines potential copy output. A number of document handlers are currently available to fill that need. These document handlers must operate flawlessly to virtually eliminate the risk of damaging the originals and generate minimum machine shutdowns due to uncorrectable misfeeds or document multifeeds. It is in the initial separation of the individual documents from the document stack where the greatest number of problems occur.

In document handlers where the document set may be circulated a plurality of times, the document handler is normally provided with a bottom sheet separator-feeder to allow feeding of documents while documents which have already been copied are returned to the top of the document stack. In this way after all the documents have been copied, they are in the correct order for recirculation if necessary.

One of the major problems with bottom sheet feeders is that without knowing how large a stack of documents is to be placed in the feed tray or the paper weight of the individual documents, it is difficult to design a sheet separator that is gentle enough for small stacks or light weight paper and still capable of handling large stacks or heavy weight paper.

In U.S. patent application Ser. No. 081,499 filed on Oct. 3, 1979 in the name of Thomas J. Hamlin and commonly assigned with the subject application, there is disclosed a vacuum corrugating feeder wherein the design of the document tray, the orientation of the vacuum separator belts, the design and orientaton of the air knife, the use of a single blower to provide sub-atmospheric and atmospheric air pressure for the vacuum separator belts and the air knife, and the air flow control valve all combine to provide a sheet separator that is relatively insensitive to the variation in document stack size or paper weight.

However, it has been found that with extremely stiff documents, which resist the corrugating effect produced by the feeder design and thereby do not conform as closely as desirable to the vacuum separator belts, the document may not be held on the feed belts securely enough to assure consistant document feed, thereby resulting in the possibility of a misfeed.

It is therefore the object of this invention to provide a vacuum corrugating feeder capable of accommodating a wide range of documents from extremely light weight documents to extremely stiff documents.

SUMMARY OF THE INVENTION

A sheet feeder for separating and feeding the bottom sheet in a stack including a pluality of vacuum feed belts spaced from the bottom surface of the document stack. Corrugating means associated with the vacuum feed belts are adapted to hold the sheet acquired by the vacuum feed belts in a non-planar condition to provide a corrugation in the acquired sheet. The corrugating means are biased in an upward direction such that light weight sheets acquired by the vacuum feed belts have insufficient beam strength to deflect the corrugating means in a downward direction, thereby providing maximum corrugation in the sheet while heavy weight sheets, having a higher beam strength are adapted to force the corrugating means downward, thereby providing less corrugation to the sheet while at the same time allowing the sheet to more closely approach the vacuum openings in the vacuum feed belts for adequate acquisition of the sheet thereon.

BRIEF DESCRIPTION OF THE DRAWINGS

FIG. 4 is a top view of the document tray and feed belts of the document handler illustrated in FIG. 1.

DESCRIPTION OF THE PREFERRED EMBODIMENT

Figure 1:
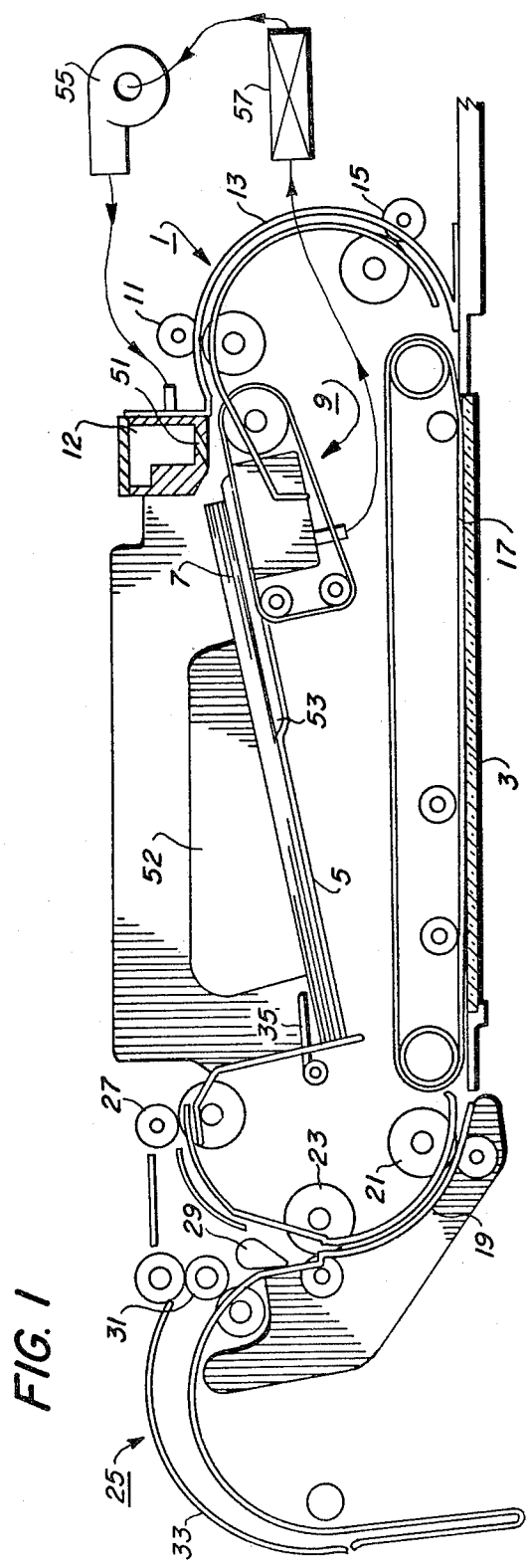
FIG. 1 is a cross-sectional view of an exemplary document handler employing the sheet separator-feeder of the present invention.

Referring to the drawings, there is illustrated an automatic document handler 1 for installation above the exposure platen 3 of a xerographic reproduction machine. The document handler is provided with a document tray 5 to be explained more fully hereinafter, adapted for supporting a stack of documents 7 face up. A vacuum belt-corrugating feeder mechanism 9 is located below the document tray for acquiring and corrugating the bottom document in the stack and forwarding the document to take away roll pair 11 after an air knife 12 has had time to separate sheet 1 from the rest of the stack. The document is then fed by take-away roll pair 11 through document guide 13 to feed-roll pair 15 and under platen belt 17 onto the platen of the copy machine for reproduction. After exposure of the document, it is fed off the platen by belt 17 into guide 19 and feed-roll pairs 21 and 23 either to an inverter mechanism 25 or back to the document stack through the feed-roll pair 27. A divertor 29 is provided to divert the document either to the inverter or to the feed roll pair 27. The inverter comprises a three roll arrangement 31 and a closed inverter pocket 33. If the document is to be inverted it is fed through the lower two rolls of the three roll inverter into the pocket. When the trail edge of the document clears the nip of the lower two rolls in the three roll inverter, the stiffness of the sheet will cause the trail edge to straighten up into the nip of the upper two rolls of the inverter at which time it will be fed into roll pair 27 and back into the document stack. The inverter pocket illustrated is sized such that when the leading edge of the document contacts the end of the pocket, the document will buckle slightly within the upper portion of the pocket 33, the buckle thereby providing the required force to feed the trailing edge of the document into the upper roll pair of the inverter rolls for feeding the sheet toward roll pair 27. If desired, an open ended inverter pocket could be utilized having a feed roll pair associated therewith for feeding the document back into the upper roll pair in a positive manner rather than relying on the sheet buckle to feed the document thereto.

The document handler is also provided with a sheet separator finger 35 as is well known in the art to separate the documents to be fed from those documents returned to the document handler. Upon removal of the last document from beneath sheet separator finger 35, the finger 35 drops through a slot provided in the tray, suitable sensors are provided to sense that the last document in the set has been removed from the tray and the finger is then rotated in a clockwise direction to again come to rest on the top of the documents in the stack prior to subsequent recirculation of the document set.

Referring more particularly to FIGS. 2, 3A, 3B and 4 wherein the novel document separator-feeder is more clearly illustrated, there is disclosed a plurality of feed belts 37 supported for movement on feed belt rolls 38, 39, and 40. Spaced within the run of the belts 37 there is provided a vacuum plenum 41 having openings 43 therein adapted for cooperation with perforations 45 in the belts 37 to provide a vacuum for pulling the bottom document in the document stack onto the belts 37. As can be seen from FIG. 3, the plenum is provided with a movable ramp portion 48 which is biased in an upward direction by spring 49 beneath the center belt run so that upon capture of the bottom document in the stack against belts 37, a center corrugation will be produced in the bottom sheet. Note also that the belts are below the surrounding support surfaces. Thus the document is corrugated into a double valley configuration. The flat surfaces of the vacuum belts on each side of the raised center belt generates a region of maximum stress in the document which varies with the document beam strength. In the unlikely event that more than one document is pulled down into contact with the feed belts, the beam strength of the second document resists the corrugating action, thus gaps are opened between sheets one and two which extend to their lead edges. These gaps and channels reduce the vacuum levels between sheets one and two due to porosity in sheet one and provide for entry of the separating air flow from the air knife 12. The air knife 12 comprised of pressurized air plenum 50 having a plurality of air jet openings 51 is provided to inject air into the pocket formed between the document pulled down against the feed belt and the documents thereabove to provide an air cushion or bearing between the stack and the bottom document to minimize the force necessary for removing the bottom document from the stack. It can be understood that if two documents are pulled down toward the belts 37, since the top sheet would not be corrugated, the air knife would inject air into the space between the two documents and force the second document off from the raised belt back toward the document stack.

By suitable valving and controls, it is desirable to provide a delay between the time the vacuum is applied to pull the document onto the belts and the start up of the feed belts to assure that the bottom document is captured on the belt before belt movement commences and to allow time for the air knife to separate sheet 1 from any sheets that were pulled down with it.

Figure 2:
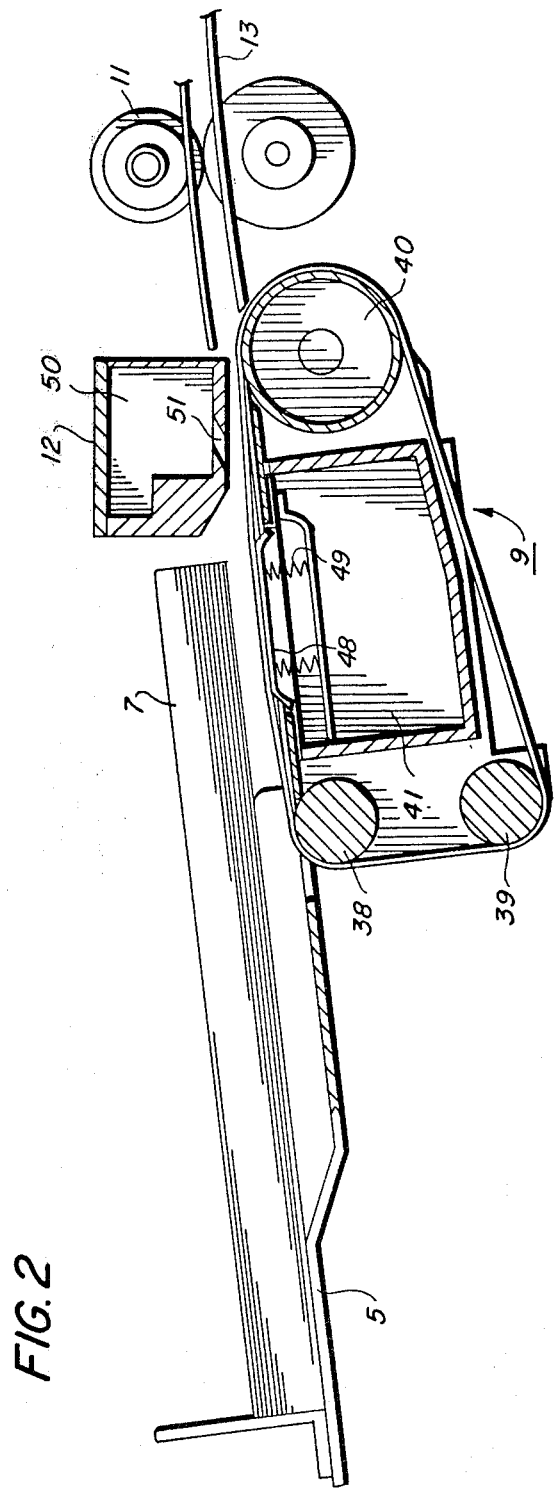
FIG. 2 is an enlarged, cross-sectional view of the separator-feeder portion of the document handler of FIG. 1.

By reference to FIGS. 1, 2 and 4 it can be seen that the document tray 5 is provided with a depressed portion or pocket 53 behind the feed belt assembly. This pocket serves a number of purposes. First, space is provided for the forward portion of the bottom document to be pulled down onto the feed belt assembly providing for formation of the two valley corrugation previously mentioned. When the bottom document is pulled into this space and corrugated, an envelope type opening or pocket is created between the bottom sheet and the remainder of the sheets in the stack. Air injected into this space from the air knife produces an air bearing between the bottom sheet and the remainder of the stack to allow easy removal of the bottom sheet from beneath the stack. Flow of air from the pocket is restricted by the partial seal or flow restriction caused by supporting the major portion of the stack weight on the edge portions of the tray surrounding the pocket.

To further increase the efficiency of the system, the stack tray is provided with a rearward tilt as seen in FIGS. 1 and 2. When flotation air is provided under the stack or between the first and second sheets, gravity will allow the sheets to settle or float back against the rear tray wall. Thus, the sheet being removed is pulled uphill while gravity helps hold the remainder of the sheets back, helping to prevent multifeeds.

By referrence to FIG. 1, it can be seen that a single blower unit 55 is utilized to provide subatmospheric pressure in plenum 41 and pressurized air to air knife 12. A valve 57 is provided in the inlet line to blower 55. With the disclosed system, the blower is operated continuously and air flow through the system is controlled by opening and closing valve 57. At the start of the feed cycle, the valve is opened. Upon opening of the valve, the flow of air from the air knife is greater than the steady state air flow i.e., the pressure and initial air flow "spikes". This initial high flow of air provides the required lifting force to float the sheet stack, which settles onto the tray between feed cycles. Once the stack is lifted by this air "spike", the lower steady state flow of air from the knife is sufficient to maintain the stack in the raised or "floating" position.

At approximately the same time that the air pressure at the air knife "spikes", the bottom sheet is acquired on the vacuum feed belts, thereby maximizing blower inlet vacuum and subsequent reduction of air flow to the air knife to the steady state level. After the bottom sheet has been fed, the valve is again closed to allow return of the previously exposed sheet to the tray without interference from the knife air flow.

With the document handler illustrated, the single blower unit provides a system which will handle a wide variation in sheet thickness of the documents placed in the document tray. When light weight sheets, which have very low beam strength, are placed in the tray, capture of the bottom sheet on the feed belts causes the sheet to closely conform to the tray pocket and lower air flow to the blower which results in a substantial reduction in the air discharged from the air knife.

Figure 3A:
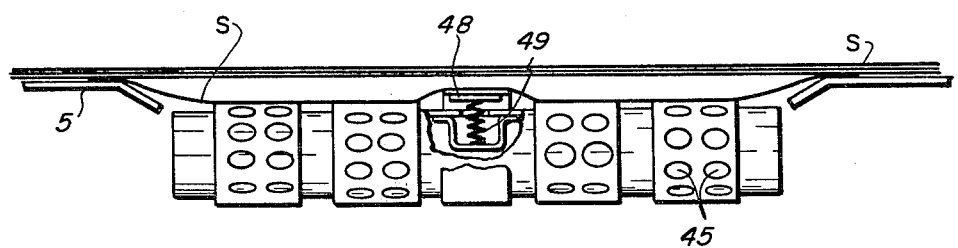
FIG. 3A is an end view, partially in section of the vacuum feed belts of FIG. 2 illustrating the improved variable corrugation of the present invention with light weight sheets thereon.
Figure 3B:
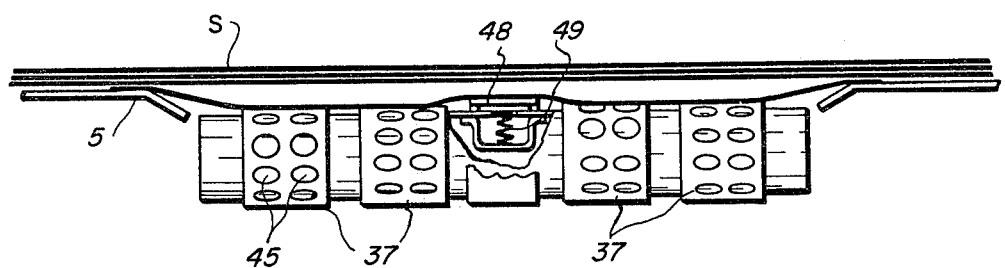
FIG. 3B is an end view, partially in section of the vacuum feed belts of FIG. 2 illustrating the improved variable corrugation of the present invention with heavy weight sheets thereon.

Due to the low beam strength of light weight paper, the movable ramp portion 48 will not be depressed thereby and a maximum corrugation will be formed in the sheet as seen somewhat exaggerated in FIG. 3A. Under these circumstances, the air flow through the system will be substantially reduced due to the conformation of the sheet to the surface of the vacuum belt assembly. However, enough air will flow through the system to operate the air knife 12 due to the fact that some of the vacuum holes will not be completely blocked since ramp 48 will hold the sheet above the belts closely adjacent the ramp. Further porosity of the sheet will also allow some air to pass directly through the sheet to the blower.

At the other extreme, heavy weight papers ordinarily have a very high beam strength. This beam strength allows the sheet to partially depress the corrugating ramp (FIG. 3B), the sheet is thereby brought closer to the vacuum openings in the feed belt assembly and the sheet is more strongly acquired than it would be with a stationary corrugating ramp. At the same time, the ramp 48 still prevents the sheet from completely covering the vacuum ports adjacent the ramp. As such, more of the vacuum port area of the feeder remains uncovered even though the sheet is closer to the belts in the ramp area than would be possible with a stationary ramp or raised corrugating section. Since more of the ports remain uncovered, a greater flow of air is provided to the blower compared to the flow when light weight sheets are fed. This provides the greater air flow from the air knife necessary to produce the desired air bearing between the sheet being fed and the remainder of the stack.

From the foregoing it can be seen that by providing a vacuum corrugating feeder of the type described with a biased or movable corrugating ramp, a wider latitude of paper sheet weight can be accommodated by the feeder while maintaining a very high degree of reliability with minimal misfeeds or multifeeds.

While I have described a preferred embodiment of my invention, it should be understood that the invention is not limited thereto but may be otherwise embodied within the scope of the following claims.

I claim:

1. A bottom sheet separator-feeder for separating and forwarding sheets seriatim comprising:
    a stack tray adapted for supporting a stack of sheets,
    vacuum feed means associated with said tray spaced from the bottom of the sheets stacked therein, said vacuum feed means being adapted to separate the bottommost sheet from the remainder of the sheet stack and acquire the sheet thereon,
    variable corrugating means associated with said vacuum sheet feed means adapted to hold the sheet acquired by the vacuum sheet feed means in a non-planar condition to provide a corrugation in the acquired sheet, said corrugating means including biasing means to bias said corrugating means toward the stack such that light weight sheets acquired by said vacuum feed means have insufficient beam strength to deflect said corrugating means away from the stack, thereby providing maximum corrugation in the sheet while heavy weight sheets, having a higher beam strength, are adapted to force said corrugating means away from the stack, thereby providing less corrugation to the sheet while at the same time allowing the sheet to more closely approach said vacuum feed means for adequate acquisition of the sheet thereon.

2. A sheet separator-feeder according to claim 1 wherein said variable corrugating means comprises a movable ramp associated with said vacuum sheet feed means, said ramp being spring biased in a direction toward the sheet stack.

3. A sheet separator-feeder according to claim 2 wherein said vacuum feed means comprises a vacuum feed belt assembly disposed beneath said stack tray for feeding sheets off the bottom of said tray, said sheet separatorfeeder further including air injection means adapted to provide a layer of air between said tray and the bottom sheet in the stack and between the bottom sheet and the remainder of the sheets in the stack, and
    single blower means associated with said vacuum feed belt assembly and said air injection means, the inlet through said blower means being connected to said vacuum feed belt assembly and the outlet of said blower means being connected to said air injection means.

4. A sheet separator-feeder according to claim 3 wherein said vacuum feed means comprises a vacuum plenum spaced within the run of the vacuum feed belt assembly which has openings adapted for cooperation with perforations in the vacuum feed belt to pull the bottom sheet down onto the belt.

5. A sheet separator-feeder assembly according to claim 4 wherein said vacuum belt assembly comprises a plurality of belts and said variable corrugating means is positioned under the center belt to bias the belt upward.

6. A sheet separator-feeder assembly according to claim 5 wherein said vacuum feed belt assembly is positioned at a level below the surrounding support surfaces of the stack tray and said corrugating means is positioned to corrugate a sheet in a double valley configuration.

* * * * *